Nov. 5, 1963    G. E. GROSS    3,109,288
OSCILLATING AND AERATING ICE AND WATER CONTROL
Filed Jan. 19, 1960

INVENTOR.
George E. Gross,
BY Parker & Carter
Attorneys.

United States Patent Office 3,109,288
Patented Nov. 5, 1963

3,109,288
OSCILLATING AND AERATING ICE AND
WATER CONTROL
George E. Gross, Oak Park, Ill., assignor to Perma-Pier,
Inc., Skokie, Ill., a corporation of Illinois
Filed Jan. 19, 1960, Ser. No. 3,399
8 Claims. (Cl. 61—1)

This is a continuation-in-part of copending application Serial No. 794,585, now abandoned, filed February 20, 1959.

This invention is in the field of methods and apparatus for controlling, eliminating or preventing the formation of ice on bodies of water, such as a pond, a lake or the like, and is more specifically concerned with a combination ice control and aeration method.

A primary object of the invention is a method of manipulating the water in a body of water, such as a lake or the like, to simultaneously aerate the water and control the formation of ice.

Another object is a method of aerating water and controlling the formation of ice thereon that requires a minimum of power, equipment and supervision and maintenance.

Another object is a method of preventing the formation of ice on the surface of a lake or the like by convection.

Other objects will appear from time to time in the ensuing specification and drawings in which.

Figure 1:
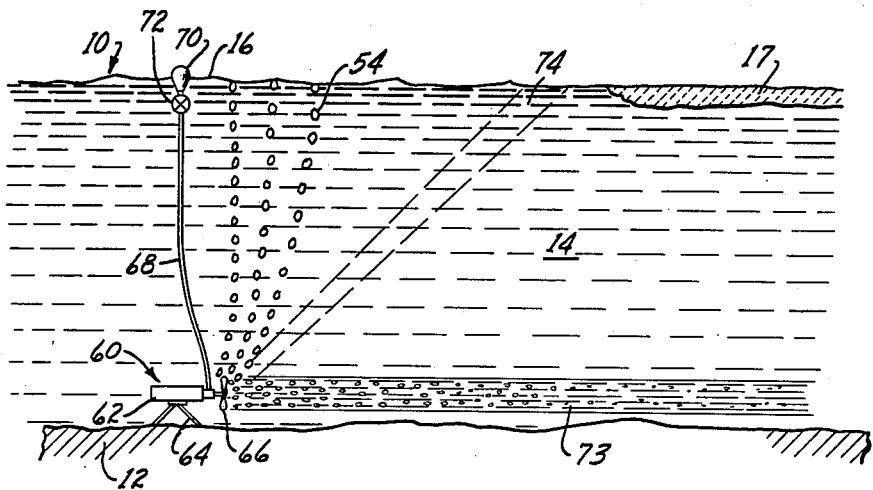
FIGURE 1 is a diagrammatic side view showing the invention.

In FIGURE 1, a body of water has been indicated generally at 10 which may be a lake, pond, river or the like. The bottom is indicated at 12, the water at 14, and the surface at 16. Ice, indicated at 17, is formed on a certain portion of the surface and it will be assumed that the showing represents winter with the ambient temperature sufficiently low to cause ice.

In FIGURE 1, a pumping unit, indicated generally at 60, includes a suitable sealed fractional horsepower underwater electric motor 62 suitably mounted on legs or a base 64 and driving a propeller 66. The electric line to the motor has not been shown. An air line 68 is connected between the unit and a suitable float 70 on the surface with the upper end of the air line exposed to draw in air. The air line may be controlled by a suitable valve 72 which, for purposes of convenience, may be located at the float or made a part of the float. Or it may be at or a part of the pumping unit. The air line is connected to the pumping unit with one or more outlets directly next to and on the low pressure side of the propeller 66. Thus, the velocity of the water moving past the air outlets will reduce the pressure in the air line such that air will be drawn down from the inlet in the float. For example, an arrangement such as in my copending application Serial No. 794,585, filed February 20, 1959, might be used.

The propeller is rotated at a relatively high speed and is directed along a line or axis, indicated generally at 73, to set up a column or shaft of otherwise free, unconfined, moving water. The reduced pressure due to the high velocity of the water will draw the air down and this air is admitted to the water column or shaft in a finely divided state. For example, the air outlets may be in the form of a multiplicity of pinholes. The air line may be restricted, as by valve 72, and regulated to reduce or control the size of the bubbles to any desired degree. In any event, the finely divided bubbles are admitted into the free column of water in a very finely divided state and are thoroughly mixed into the column by the propeller.

Bubble size is important. The bubbles should be so finely divided or of such a size that they will not tend to rise to the surface rapidly. This is to say that the bubbles should be small enough to stay in suspension indefinitely, which depends upon such factors as the surface tension between air and water at any given temperature, pressure, etc.

The finely divided bubbles are admitted to the rapidly moving liquid column in a sufficiently finely divided state such that they do not tend to rise and the column is directed along its axis 73 in a more or less horizontal direction. Or it may be tilted and directed toward the surface, as indicated at 74, if desired. This sets up a free, unconfined, aerated column which, due to the presence of the bubbles, will have a reduced density and, by convection, will slowly rise to the surface due to the greater weight of the water above it. Fresh water reaches its greatest density at 39.2° and a reduction of temperature below this point causes expansion. Because of this, during winter the warmest water lays at the bottom and the colder water of reduced density remains on the surface where freezing occurs.

By the process of aerating the lower stratum, its density is reduced below that of the surface water causing artificial convection to occur. This causes the warmer water to be raised to the surface preventing the formation of ice.

Figure 2:
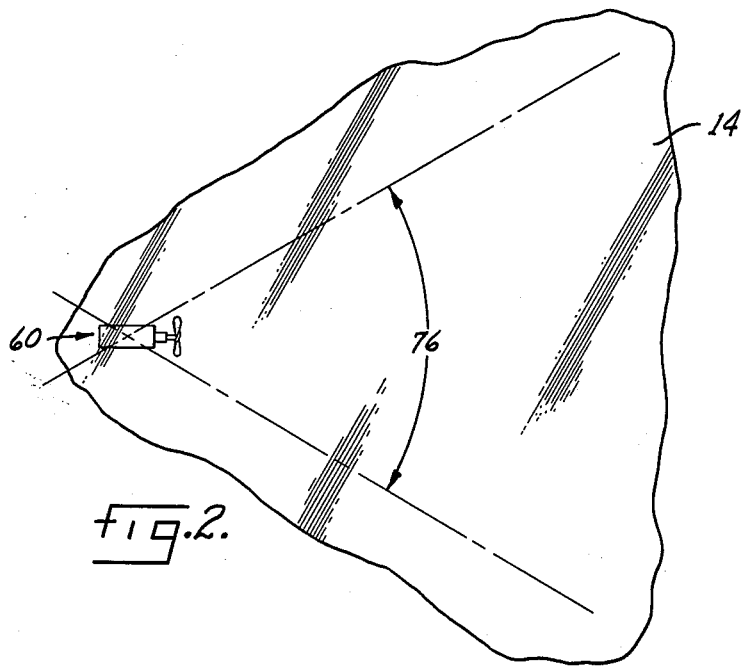
FIGURE 2 is a top view of the diagrammatic showing in FIGURE 1.

As shown in FIGURE 2, the unit is oscillated or reciprocated through a predetermined arc or sector, designated 76. The particular arc may be any selected sector, and, in fact, the unit may revolve through 360° before reversing. Or the unit may be completely rotary if desired. Or the unit may be oscillated in various planes according to a predetermined pattern. But, in any event, the speed of movement, be it oscillation, reciprocation, or rotation, is related to the velocity of the column such that a stratum of lower density aerated water will be created at a given level and the entire stratum will rise to the surface to prevent or eliminate ice. By oscillating the unit through a given arc, the lower density current shaft may be converted into a low density stratum. The speed of oscillation or reciprocation may be governed in accordance with the rate of convection rise of the thus created stratum so that the shaft from the unit will create a stratum by a given number of strokes before perceptible upward movement takes place. The speed of oscillation should be related to the extent of the arc in ice control work so that the lower density shaft will pass through a given point according to a desired cycle. The speed of oscillation effects the shafting distance so that if it is desirable to only open up the ice relatively close to the unit, a more rapid oscillation should be employed whereas a slow oscillation would cause the aerated shaft of water to flow much farther from the unit.

In combination with aeration and oscillation, the following type control may be used. By a combination of slow oscillation and air restriction for very fine bubbles, the water shaft can be made to extend a greater distance. By a combination of rapid oscillation and large bubbles, the water shaft will be confined to a much smaller area.

Another variable controlling the water shaft behavior is the propeller pitch which may be pre-set for the desired water flow velocity.

The unit may be regulated so that in addition to the finely divided bubbles which are admitted to the propelled column, somewhat larger bubbles 54 may be released which, due to their size, will rise rapidly to the surface and will cause a mechanical lifting of the warmer water to the surface. It will be noted that the larger bubbles will rise more or less directly over or adjacent the unit and will thereby keep the surface directly above and adjacent the operating unit ice free. The shafting with the more finely divided bubbles will deice the somewhat more remote areas around the unit and the combination of the two will keep an extensive area ice free. The unit may be operated continuously or cycles on any given off and on cycle or pulsating basis.

The air line may be restricted by the valve 72 which may be manually set and it has been noted that the higher the vacuum in the air line, the more finely divided the bubbles will be. The bubble size may be accurately controlled by throttling the air inlet. The precise size of the bubbles necessary cannot be accurately determined at the moment, other than by a trial and error method. But by throttling the inlet, the bubble size can be observed and the throttle can be set when the bubbles are small enough so that they will stay in suspension and will not rise rapidly of their own accord. The throttle should be variable so that in any particular installation or under any set of conditions, such as temperature, depth of the unit, cycle established, etc., the bubble size can be set by adjusting the throttle to obtain the desired aerated stratum formation.

The arc or extent of oscillation covered is optional, but the rate or speed of movement should be related to the velocity of the water in the current shaft so that the result will be a distinct stratum of aerated water with a reduced density.

The particular method or structure used for introducing the air into the current column may be any suitable arrangement, such as shown in my copending application Serial No. 840,461, filed September 16, 1959, or copending application Serial No. 21,799, filed April 12, 1960. A particular oscillation mechanism has not been shown and described but it may be of any suitable type, as in copending application Serial No. 21,799, filed April 12, 1960.

Instead of just air, I might also introduce hydrogen or any suitable inexpensive lightweight gas or fluid into the current shaft to reduce the density, and depending upon the particular gas or fluid selected, the valve may be adjusted to give the size of bubble necessary which, when it is in suspension, will raise the thus created stratum by convection. Also, oscillating the unit will serve to more effectively mix the two fluids, be they air and water or otherwise.

The unit might be disposed in the deeper water of the lake and directed slightly upwardly into the shallow water, for example, toward and under a dock with sufficient oscillation to keep the dock and a given area on each side and in front of it ice free.

When only aeration is required, such as in summer, the oscillation mechanism may be inactivated. In some cases the unit may be operated with aeration but not oscillation, which would produce a long narrow ice free area.

The addition of air to the water not only sets up artificial convection, but also helps prevent "winter kill" of fish due to oxygen deficiency. The bubbles may be made so fine that only aeration and not convection will take place. So control of bubble size is very important in getting aeration alone, or a combination of aeration and convection, or convection alone, by controlling the inlet or in some other manner.

The unit may be directed upwardly to form a crown at a given point or may be moved through a predetermined pattern while so directed to form a moving crown to keep floating debris away from a given area, for example, from around a pier or from in front of a water intake or away from an irrigation ditch.

The details of the configuration and contour of the propeller, the precise makeup and character of the electric motor, other than the fact that it is an underwater unit, the makeup of the float and the details of the valve, are not important to the present invention. The air line may be brought above the water surface at the shore line or on a pier and need not necessarily be supported by a float. This makes for easier adjustment of the air inlet. The air inlet valve may be simple drilled plugs which are interchangeable for variable air input.

I might also meter water into the air line on an intermittent basis so that the water would, due to centrifugal force, provide a piston effect at the air outlet, thereby increasing the volume of airflow without varying the bubble size. Such a water inlet could be provided at any point in the air line and a suitable metering or alternating device could be provided to admit the water on an off and on basis and could be adjustable to vary the over-all quantity admitted in any given period.

While I have shown and described the preferred form of my invention, it should be understood that suitable additional modifications, changes, substitutions and alterations may be made without departing from the invention's fundamental theme. It is, therefore, wished that the invention be unrestricted, except as by the appended claims.

I claim:

1. A method of aerating at least a substantial portion of a large body of water, such as a lake or the like, and at the same time preventing the formation of ice on the surface thereof in a defined area, including the steps of locally propelling the water at a selected location below the surface thereof and in a defined direction to set up an unconfined otherwise free current shaft in the water, directing the current shaft under the defined area, moving air from above the surface of the body of water down to the unconfined current shaft, dividing the air into fine bubbles of a size small enough, in relation to the surface tension between air and water, such that the finely divided bubles will remain in suspension and will not rise rapidly to the surface, and introducing the finely divided bubbles into the unconfined current shaft so that the resultant mixture of water and finely divided bubles will set up an aerated column having a reduced density, whereby the reduced density aerated column will rise to the surface of the body of water in the defined area.

2. The method of claim 1 further characterized by and including the step of allowing the reduced density aerated column to rise freely to the surface due to the pressure of the more dense water around it.

3. The method of claim 1 further characterized by and including the step of directing the unconfined current shaft toward the surface.

4. The method of claim 1 further characterized by and including the step of changing the defined direction of the thus formed unconfined current shaft about the point of air introduction on a cyclical basis and at all times keeping the current shaft directed generally under the defined area to thereby establish a reduced density stratum under the defined area in the body of water.

5. The method of claim 1 further characterized in that the step of moving air from above the surface of the body of water down to the unconfined current shaft includes using the reduced pressure, caused by the high velocity of the currrent shaft, to draw air down under less than atmospheric pressure.

6. A method of aerating at least a substantial portion of a large body of water, such as a lake or the like, including the steps of propelling the water in a localized area at a point below the surface thereof at a relatively high velocity, allowing the thus propelled water to proceed freely in a defined direction to set up an unconfined current in the water, moving air from above the surface of the body of water down to the current by using the reduced pressure, caused by the high velocity of the current, to draw air down under less than atmospheric pressure, establishing the velocity of the current high enough relative to the depth of the current below the surface such that the reduced pressure caused by the velocity of the thus propelled water will be sufficient to draw the air down to the current, introducing the air into the current shaft in the form of finely divided bubbles, and restricting the air as it is drawn so that the thus formed bubbles will be of a size small enough, in relation to the surface tension between air and water, such that the finely divided bubbles will remain in suspension and will not rise rapidly to the surface.

7. A method of manipulating water in a large body of water, such as a lake, pond, river or the like, including the steps of locally propelling the water at a select location below the surface thereof in a defined direction to set up a current in the body of water, moving air from above the surface of the body of water down into the body of water, dividing the air into finely divided bubbles of a size small enough, in relation to the surface tension between air and water, such that the finely divided bubbles will remain in suspension and will not rise rapidly to the surface, introducing the finely divided bubbles into the current so that the resultant mixture of water and finely divided bubbles will have a reduced density relative to the adjacent water in the body of water resulting in buoyancy of the current, and bringing the current to the surface of the body of water.

8. The method of claim 7 further characterized by and including the step of locally propelling the water in a generally horizontal direction, and allowing the reduced density aerated column to rise freely to the surface due to the pressure of the more dense water above it.

References Cited in the file of this patent

UNITED STATES PATENTS

| | | |
|---|---|---|
| 2,116,023 | Gwidt | May 3, 1938 |
| 2,417,519 | Persson et al. | Mar. 18, 1947 |
| 2,856,704 | Hebert | Oct. 21, 1958 |
| 2,991,622 | Oster | July 11, 1961 |

FOREIGN PATENTS

| | | |
|---|---|---|
| 886,580 | Germany | Aug. 17, 1953 |
| 1,163,168 | France | Apr. 21, 1958 |

OTHER REFERENCES

The Detroit News, Dec. 19, 1957; page 46.